June 26, 1951  H. J. HORN  2,558,297
BRAKE DRUM

Filed April 5, 1949  3 Sheets-Sheet 1

Inventor
HARRY J. HORN

By Barnes, Kisselle, Laughlin & Raisch
Attorneys

June 26, 1951        H. J. HORN        2,558,297
BRAKE DRUM
Filed April 5, 1949        3 Sheets-Sheet 2
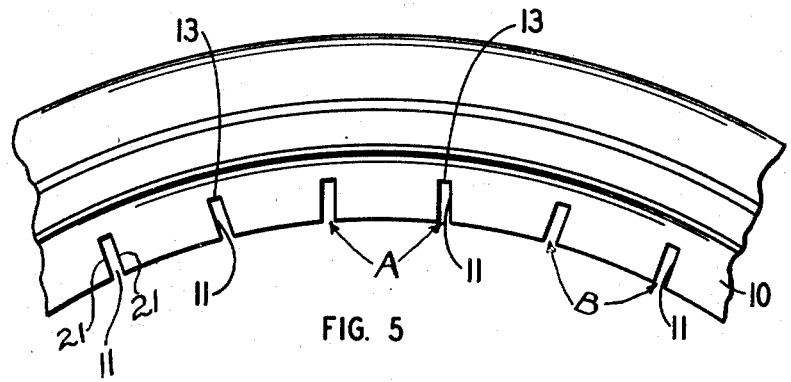
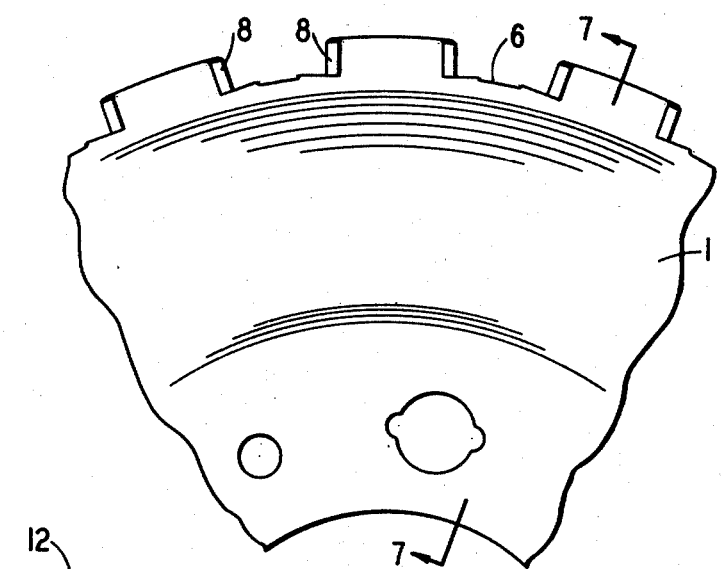
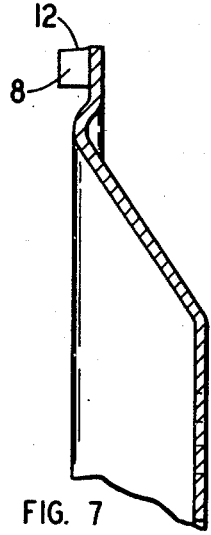
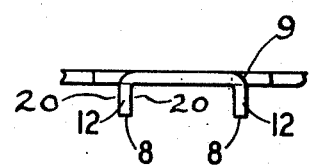
Inventor
HARRY J. HORN
By Barnes, Kisselle, Laughlin & Raisch
Attorneys June 26, 1951 H. J. HORN 2,558,297
BRAKE DRUM Filed April 5, 1949 3 Sheets-Sheet 3

Inventor
HARRY J. HORN

By Barnes, Kisselle, Laughlin & Raisch
Attorneys

Patented June 26, 1951

2,558,297

UNITED STATES PATENT OFFICE 2,558,297

BRAKE DRUM

Harry J. Horn, Lansing, Mich., assignor to Motor Wheel Corporation, Lansing, Mich., a corporation of Michigan Application April 5, 1949, Serial No. 85,619

10 Claims. (Cl. 188—218)

This invention relates to brake drums and more particularly to a brake drum wherein the ring and back are independently formed members.

This invention contemplates a brake drum wherein the ring is securely attached to the back so that the ring can expand and contract radially with respect to the back but is fixed to the back securely against axial and angular movement relatively thereto.

It is an object of this invention to produce a brake drum which is of simple structure, relatively inexpensive, and which is capable of annular expansion independently of the back.

My invention also contemplates a novel, simple and economical method for fabricating a composite brake drum so that the ring cannot move axially or angularly relative to the back but can expand and contract radially thereof.

The novelty of my brake drum resides in the manner and method in which the brake drum ring is attached to the brake drum back.

Fig. 5 is a partial elevation showing the slots in the flange on the brake drum ring.

Fig. 6 is a partial elevation of the back with the fingers sheared and bent to approximately 90° with the back.

Fig. 7 is a section on the line 7—7 of Fig. 6.

Fig. 8 is a view looking at the edge of the back as shown in Fig. 6 and showing the position of the fingers.

My brake drum comprises a back 1 and a ring 2. Back 1 is preferably a metal or steel stamping and ring 2 preferably consists of a metal or steel stamping 3 provided with a centrifugally cast iron lining 4.

Figure 9:
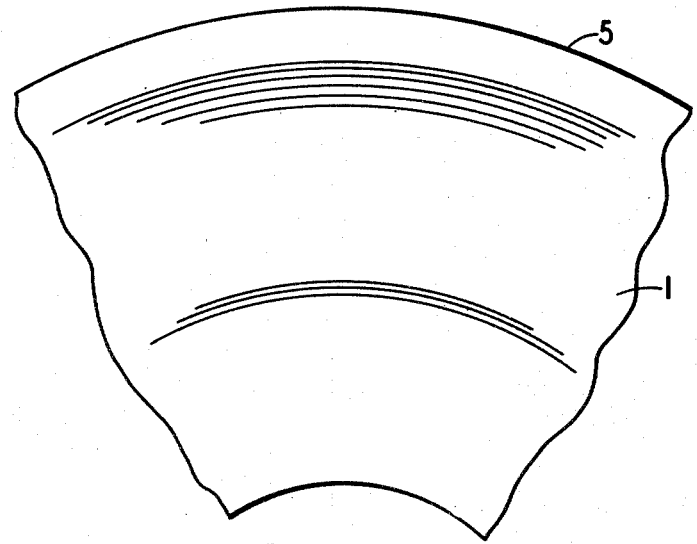
Figs. 9, 10 and 11 are fragmentary elevations of the back showing the method of forming the fingers on the circumference of the back.
Figure 10:
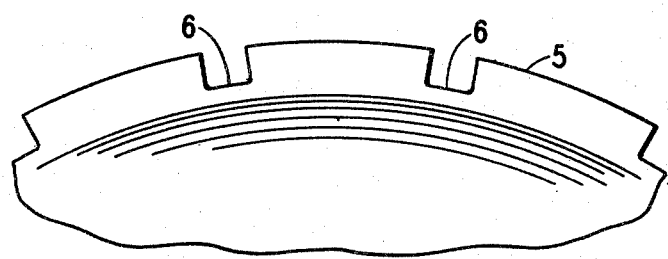
Figure 11:
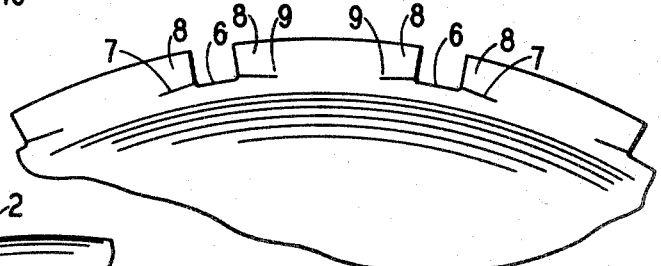

Back 1, which takes the form of a circular disk having a circumferential edge 5, Fig. 9, has its circumferential edge portion sheared out as at 6 at preferably uniformly spaced points. The edge portion of back 1 is then sheared or cut circumferentially a short distance as at 7 from the radially inner opposite corners of each notch 6 to provide finger portions 8 (Fig. 11). These finger portions are now bent outwardly about their junctions 9 with the main portion of back 1 at an angle of about 90°, Figs. 6, 7 and 8, and so that fingers 8 now extend nearly or substantially radially to correspond with slots 11 (described below).

Figure 3:
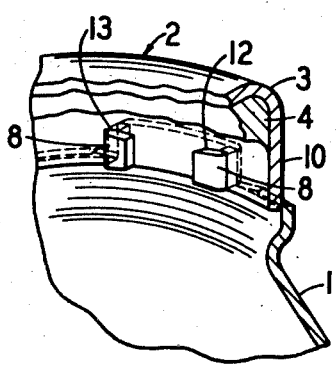
Fig. 3 is a fragmentary isometric view of my brake drum showing the manner of connecting the drum ring and drum back with the back mounted on the outside of the ring flange.

Ring 2 is provided with a circumferential flange 10 the inner circumferential edge portion of which is provided with a plurality of preferably equally circumferentially spaced slots 11. The bottoms 13 of slots 11 are preferably located on the same circumference about the center of the ring. The spacing of slots 11 corresponds to the circumferential spacing of fingers 8 so that fingers 8 will fit accurately in slots 11 when ring 2 is mounted on and about back 1. Ring 2 is now mounted on and about back 1, as shown in Fig. 3, with back 1 on the outside of flange 10 and with the perpendicular fingers 8 (Fig. 7) seated in their corresponding notches 11. Fingers 8 are now bent over (Fig. 3) to clamp the ring to the back 1.

Figure 1:
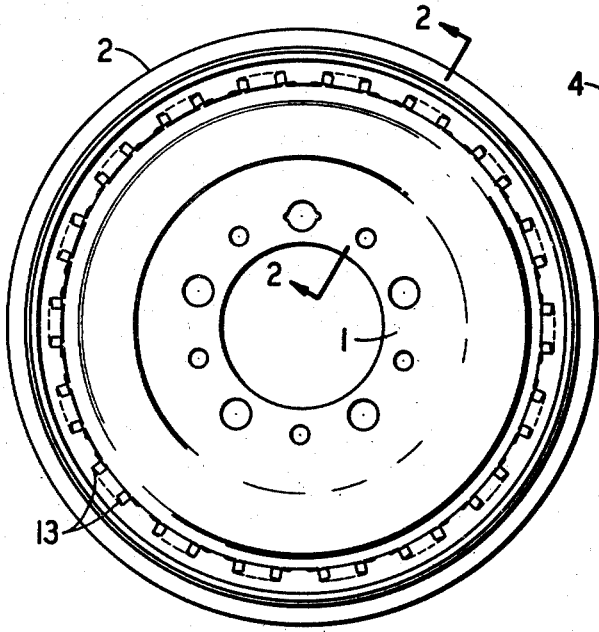
Fig. 1 is an inside elevation of my brake drum.
Figure 2:
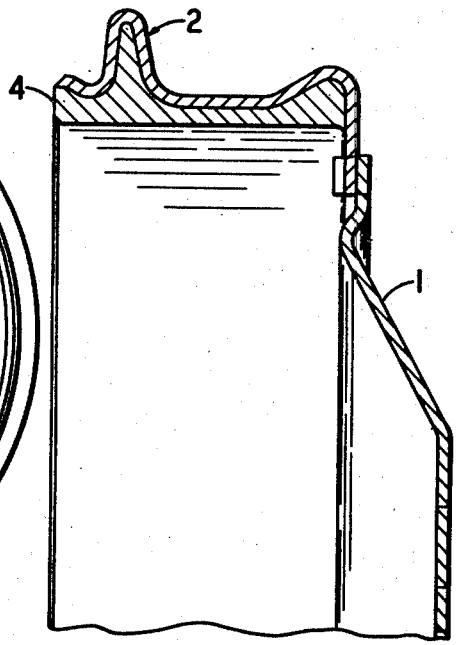
Fig. 2 is a partial section on the line 2—2 of Fig. 1.

The sides 20 of the fingers have a nice or close fit with the sides 21 of slots 11. The fit of the fingers 8 with the sides 21 of slots 11 is sufficient to center the back with respect to the ring when it is assembled to, or put on, the ring. It is not necessary that the outer edges 12 of fingers 8 seat on the bottoms 13 of slots 11. In fact, it is desirable that the outer edges 12 of fingers 8 have a small clearance with bottoms 13 of slots 11 because this makes the assembly of the back and ring more easily accomplished. It will be appreciated from Fig. 1 that any undue or substantial bodily movement of the back 1 relative to ring 2 along any diameter will be prevented by the contact between the sides 20 of the fingers and the sides 21 of the slots 11 located 90° from such diameter. In assembling the ring and back it is, of course, appreciated that they will be centered when the fingers 8 are bent over to clamp the ring and back together.

Figure 4:
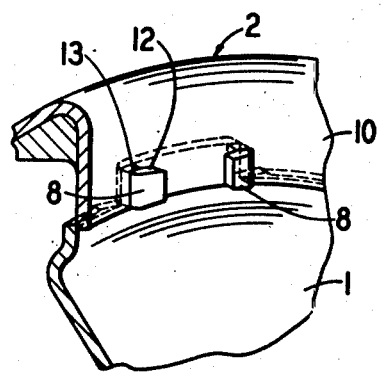
Fig. 4 is a fragmentary isometric view showing the manner of connecting the drum ring to the drum back with the back mounted on the inside of the ring flange.

In the construction shown in Fig. 4, back 1 is mounted on the inside of flange 10 and fingers 8 are bent outwardly of brake ring 2 (that is, in the opposite direction from fingers 8, Fig. 3) to securely clamp the ring 2 and back 1 together.

Figure 12:
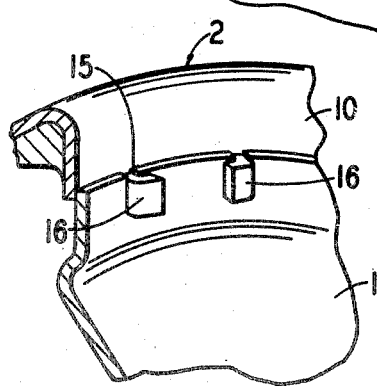
Fig. 12 is a partial isometric showing of a modified form of my brake drum.

In the modification of my brake drum, shown in Fig. 12, the position of the slots 11 and fingers 8 are reversed, that is, the brake back 1 is provided with circumferentially spaced slots 15 which correspond with slots 11 and the flange 10 of the brake ring 2 has fingers 16 corresponding to fingers 8 formed therein in the same manner as described above where the fingers 8 are formed in the circumferential edge of the brake back 1. Back 1, by way of example, is mounted on the outside of flange 10 with fingers 16 located in slots 15 in back 1 so that ring 2 is accurately positioned on back 1. Fingers 16 are bent over back 1 to securely clamp the ring to the back.

In each form of my composite brake drum the bent over fingers on the one member cooperate with the slots in the other member to securely hold the ring 2 against either axial or angular movement with respect to back 1 but the clamping action effected by fingers 8 or 16 is not sufficient to prevent radial movement between the back and the ring such as occurs when the brake ring 2 is subjected to brake shoe pressures and the heat created by the braking action of the brake shoes on the brake ring. Thus, it will be seen that the connection between the back 1 and ring 2 is such that it will effectively transmit braking torque from the ring to the back but at the same time will allow radial or annular expansion of the ring relative to the back.

Slots 11, 16 extend in a substantially or generally radial direction but they need not be exactly radial. It will be noted from Fig. 5, for example, that slots 11 are not exactly radial but extend substantially or generally in a radial direction and that slots 11 are parallel in pairs. Thus, slots 11 of pair A are parallel, slots 11 of pair B are parallel, etc. Slots 11 can be truly radial but preferably they are made nearly or substantially radial and made parallel in pairs because this facilitates the bending of fingers 8 and produces a better connection between the bent fingers 8 and the portions of the ring (Fig. 4) or back (Fig. 12) next to the slots and over which the fingers are bent or clamped. Thus, the term "radial" is used herein in defining slots 11 in the sense that it includes not only truly radial but also nearly or substantially radial slots.

Fingers 8 cooperate with slots 11 to tightly clamp the ring and back together in what might be termed a tight frictional connection, that is, radial expansion of ring 2 with respect to back 1 due to braking heat or pressure is possible and occurs but such movement is only possible after substantial friction between fingers 8, slots 11 and the portion of the ring or back over which fingers 8 clamp, is overcome. Thus, ring 2 is free to expand radially with respect to back 1 only in the sense that this expansion is retarded by substantial friction but the fact remains that such radial expansion and contraction of the ring relative to the back is possible and occurs in actual operation or use of my composite brake drum. Thus, free radial movement of the ring with respect to the back means possible movement but not unhampered movement.

I claim:

1. A composite brake drum comprising a back and a ring having a circumferentially inwardly extending flange, a connection between the flange portion of the ring and the circumferential edge portion of the back comprising a plurality of generally radial slots in one of said portions and a plurality of fingers carried by the other of said portions and seated in said slots, the said fingers on the one portion being bent over the said other portion to clamp the ring and back together whereby said fingers transmit torque between the ring and back and allow expansion of the ring relative to said back.

2. The brake drum claimed in claim 1 wherein the flange portion of the ring overlaps the circumferential edge portion of the back.

3. The brake drum claimed in claim 2 wherein the slots are formed in the edge portion of the brake ring flange and the fingers are integral with the circumferential edge portion of said back.

4. The brake drum claimed in claim 3 wherein said generally radial slots consist of a plurality of pairs of slots with the slots of each pair parallel.

5. The brake drum claimed in claim 4 wherein the bottom of said slots are located on the same circumference and the fingers are seated on the bottom of said slots.

6. A composite brake drum comprising a back and a ring having a circumferentially inwardly extending flange, the inner circumferential edge portion of said flange overlapping the outer circumferential edge portion of said back, a connection between the overlapping portions comprising a plurality of generally radial slots in one of said portions, the said slots being circumferentially spaced about the member in which they are located and a plurality of fingers carried by the other of said overlapping portions and passing through said slots, the said fingers on the one portion being bent over the other portion to clamp the ring and back together whereby said fingers transmit torque between the ring and back and allow radial expansion of the ring relative to said back, the said fingers being spaced circumferentially about the member on which they are carried whereby the fingers and slots cooperate to center the ring about said back.

7. The method of constructing a brake drum composed of a ring member and a back member which comprises forming a plurality of circumferentially spaced generally radial slots in one of said members, shearing the other of said members along circumferentially spaced lines to form fingers, bending the fingers out of the plane of said member along their lines of junction with the body of said member, mounting the ring around the back and inserting the fingers in said slots, then bending the portion of said fingers projecting beyond the slotted member over the slotted member to join said members together.

8. The method of constructing a brake drum composed of a ring member and a back member which comprises forming a plurality of circumferentially spaced generally radial slots of substantially equal radial depth in the circumferential edge portion of one of said members, shearing the other of said members along circumferentially spaced generally radially and circumferentially extending lines to form fingers, bending the fingers out of the plane of said member along their radial lines of junction with the body of said member, mounting the ring around the back and inserting the fingers in said slots, then bending the portion of said fingers projecting beyond the slotted member over the slotted member to join said members together.

9. The method of constructing a brake drum composed of a ring member and a back member which comprises forming a plurality of circumferentially spaced substantially radial slots of substantially equal radial depth in the circumferential edge portion of one of said members, shearing the other of said members along circumferentially spaced substantially radially and circumferentially extending lines to form fingers, bending the fingers out of the plane of said member along their radial lines of junction with the body of said member, mounting the ring around the back with the inner circumferential edge portion of the ring overlapping the outer circumferential edge portion of the back and inserting the fingers in said slots, then bending the portion of said fingers projecting beyond the slotted member over the slotted member to join said members together.

10. The method claimed in claim 9 wherein the substantially radial slots are formed in the circumferential edge portion of the ring and the fingers are sheared out of the circumferential edge portion of the back.

HARRY J. HORN.

REFERENCES CITED

The following references are of record in the file of this patent:

UNITED STATES PATENTS

| Number | Name | Date |
|---|---|---|
| 2,014,865 | Schmidt | Sept. 17, 1935 |
| 2,038,842 | Horn | Apr. 28, 1936 |
| 2,080,395 | Begg et al. | May 18, 1937 |
| 2,096,177 | Hunt et al. | Oct. 19, 1937 |
| 2,099,833 | Van Halteren | Nov. 23, 1937 |